United States Patent
Razzell

[19]

[11] Patent Number: 5,805,017
[45] Date of Patent: Sep. 8, 1998

[54] BASEBAND DEMODULATION OF M-ARY FREQUENCY SHIFT KEYED SIGNALS AND A RECEIVER THEREFOR

[75] Inventor: Charles J.H. Razzell, Cambridge, England

[73] Assignee: U.S. Philips Corporation, New York, N.Y.

[21] Appl. No.: 769,905

[22] Filed: Nov. 13, 1996

[30] Foreign Application Priority Data

Nov. 17, 1995 [GB] United Kingdom .................. 9523578

[51] Int. Cl.⁶ .............................. H03D 3/00; H04L 27/14
[52] U.S. Cl. .......................... 329/300; 329/302; 375/324; 375/335
[58] Field of Search ................... 329/300–303; 375/324, 325, 334–337

[56] References Cited

U.S. PATENT DOCUMENTS 4,554,509 11/1985 Cornett ..................................... 329/334

*Primary Examiner*—David Mis
*Attorney, Agent, or Firm*—Dicran Halajian

[57] ABSTRACT

A method of, and receiver for, receiving and demodulating M-ary FSK symbols, where M equals two or four, comprising over sampling a received signal to obtain sub-symbols which are treated as repeated DBPSK $\pi/4$DQPSK symbols, respectively. The sub-symbols are applied to a delay and multiply demodulator in which the duration of the delay has been optimised to give M equidistant points on a unit circle. The output from the demodulator comprises log likelihood ratios which are then integrated in an integrating filter to give a maximum likelihood estimate of the bits comprising the symbols transmitted.

12 Claims, 2 Drawing Sheets

BASEBAND DEMODULATION OF M-ARY FREQUENCY SHIFT KEYED SIGNALS AND A RECEIVER THEREFOR

BACKGROUND

1. Field of the Invention

The present invention relates to a receiver for receiving and demodulating M-ary FSK (frequency shift keyed) signals, where M has a value of 2 or 4. Such signal modulation schemes may be used in selective call systems such as digital paging.

2. Related Art

A known type of demodulator for FSK signals is shown in FIG. 1 of the accompanying drawings, which figure is a block schematic diagram of a delay and multiply demodulator which can be used with a zero IF receiver which provides complex signals at baseband. The complex digital signals are applied to an input 10. The input 10 is coupled to one input of a multiplier 12 and to a delay stage 14, an output from which is coupled to a second input of the multiplier 12. The choice of delay is arbitrary. An output signal from the multiplier 12, which signal is still complex, is low pass filtered in a low pass filter 16. An output of the filter 16 is applied to a decision stage 18 which provides a hard decision on its output.

In this type of demodulator the frequency of the complex exponential wave is estimated by measuring the phase change over a fixed time period.

A discrete time implementation of the FIG. 1 will be considered in which the k th sample of the received signal is given by $$R_k = e^{j\omega T_s k}$$

where $T_s$ is the sampling interval, and $\omega$ is the angular frequency which is to be estimated. A decision variable is formed as $$Y_k = R_k \times R^*_{k-m}$$
$$= e^{j(\omega T_s m)}$$

where m is a chosen integer number of samples.

SUMMARY

It is an object of the present invention to demodulate complex signals at baseband in such a manner as to be able to make soft decisions on the demodulated signals.

According to one aspect of the present invention there is provided a method of demodulating a M-ary FSK signals, where M equals 2 or 4, comprising treating the FSK signals as N repetitions of a differential phase shift keyed signal, deriving the log likelihood ratios for said repetitions and integrating said log likelihood ratios to obtain a maximum likelihood estimate of the bits comprising each transmitted symbol.

The one aspect of the invention provides a method of receiving and demodulating M-ary FSK symbols, where M equals 2 or 4, comprising providing quadrature related, frequency down-converted signals at substantially zero intermediate frequency, over-sampling the signals, multiplying each sample by a time delayed sample, the amount of time delay being such that the products of multiplication comprise log likelihood ratios for the bits which compose the M-ary FSK symbols, and combining a plurality of said log likelihood ratios in an integrating filter to obtain a maximum likelihood estimate of the bits comprising the symbols as transmitted.

According to a second aspect of the present invention there is provided a demodulator for an M-ary FSK signals, where M equals 2 or 4, comprising means for treating the FSK signals as N repetitions of a differential phase shift keyed signal, means for deriving the log likelihood ratios for said repetitions and means for integrating said log likelihood ratios to obtain a maximum likelihood estimate of the bits comprising each transmitted symbol.

The second aspect of the present invention provides a receiver for M-ary FSK symbols, where M equals 2 or 4, comprising means for producing quadrature related signals at substantially zero intermediate frequency, means for over-sampling the signals, a delay and multiply demodulator having an input for said samples, the time delay being selected such that quadrature related outputs of the demodulator are log likelihood ratios for bits which compose the M-ary symbols, and an integrating filter for combining a plurality of said log likelihood ratios to obtain a maximum likelihood estimate of the bits comprising the symbols as transmitted.

The present invention is based on the realisation that a FSK signal can be seen as N repetitions of a differential phase shift keyed signal. Thus if a FSK symbol is over-sampled then the sub-symbols obtained can be regarded as DPSK symbols. When such sub-symbols are applied to a delay and multiply demodulator, and the delay is optimised, log likelihood ratios are obtained from the multiplier. Integrating these ratios in an integrating filter gives a maximum likelihood estimate of the symbols transmitted. As a result a very simple decision algorithm can be applied.

BRIEF DESCRIPTION OF THE DRAWINGS

The present invention will now be described, by way of example, with reference to the accompanying drawings, wherein.

In the drawings, the same reference numerals have been used to indicate corresponding features.

DESCRIPTION OF THE PREFERRED EMBODIMENTS

In the following description, M-ary FSK is viewed as M-ary DPSK with symbol repetition coding. For example, 4-FSK with deviations of ±4.8 kHz and ±1.6 kHz at 3200 Baud can be seen as π/4-DQPSK at 12800 Baud, with each symbol repeated 4 times.

Figure 1:
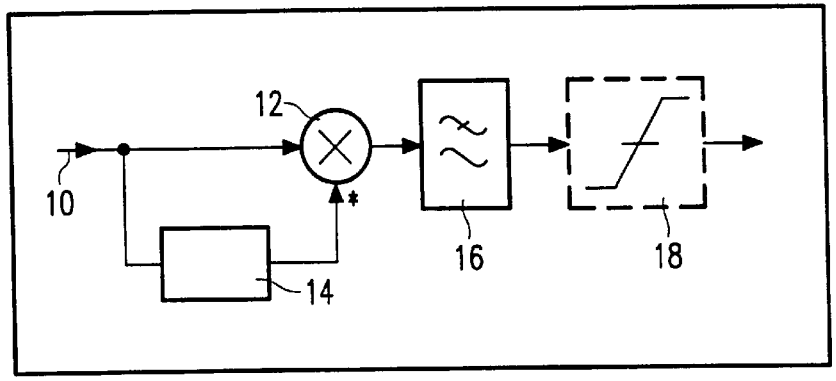
FIG. 1 is a block schematic diagram of a delay and multiply demodulator.
Figure 2:
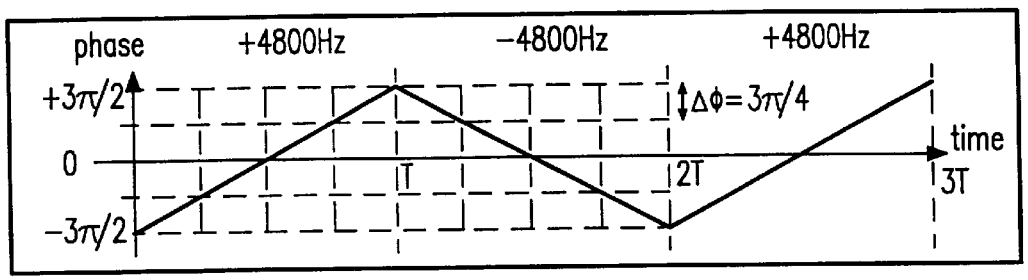
FIG. 2. is a graph of time (the abscissa) versus phase (the ordinate) illustrating phase trajectory for 4-FSK with 4800 Hz deviation at 3200 baud.

FIG. 2 illustrates that if sampling is performed at 4 samples per symbol and the samples are taken at exactly the optimum timing instant, the phase change per sample interval is ±3π4 radians corresponding to deviations of ±4.8 kHz respectively for all four possible measurement intervals in the symbol. If, however, the sampling is misaligned or arbitrary, only three of the four measurement intervals will contain non-corrupted information. The latter is more likely to be the case since symbol timing recovery may not be possible prior to demodulation. If N is the over-sampling rate and m is the number of samples delay, only N−m computations of the decision variable will contain information gathered from within just one symbol; up to m of them may contain a mixture causing inter-symbol interference (ISI). In order to maximise the signal to noise ratio of the samples of the decision variable, a matched filter is applied to the known, rectangular portion of N−m samples of the received waveform. The required matched filter is a FIR filter with all the N−m tap weights set to unity.

The values of $T_s$ and the discrete delay m are chosen such that $$\hat{\omega}T_s m = \frac{\pi(M-1)}{M}$$

for an M-ary FSK system with a maximum angular deviation of $\hat{\omega}$ radians/sec. The product $T_s m$ may be regarded as being a constant and in theory $T_s$ and m can have a wide range of values. However since the FSK signal is being over-sampled then $T_s$ has to be a fraction of the symbol period and $m \geq 1$ and a member of a set of integers.

The above choice of the delay given by the product $T_s m$ gives a maximum Euclidian distance separation of the resultant points on the complex plane. It also means a very simple decision circuit can be used for 2- and 4-level frequency shift keying modulations.

Figure 3:
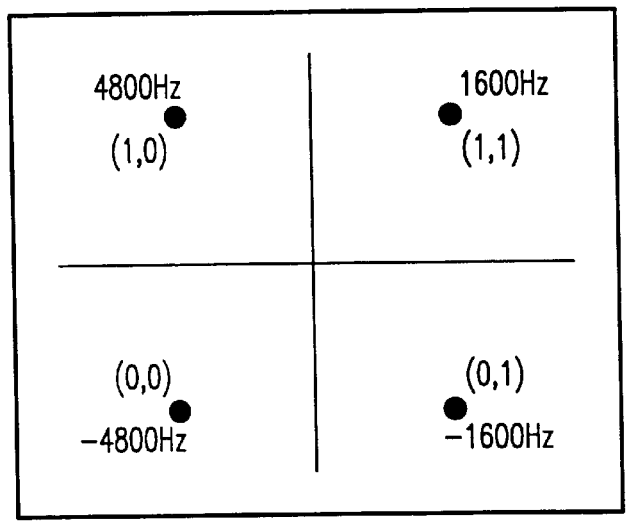
FIG. 3 is a graph showing di-bits and frequency shifts mapped onto the complex plane.

The mapping shown in FIG. 3 is achieved by the choice of delay m for a 4-FSK modulation such that the M points are equidistant from each other on a unit circle.

Due to the Gray coding and the particular frequency to phase mapping achieved by the choice of discrete delay, a very simple decision algorithm can be applied.

1. If $\Re(Y_k) > 0$, least significant bit=1; else 0
2. If $\Im(Y_k) > 0$, most significant bit=1; else 0.

This clearly avoids the need for any trigonometric functions in order to relate the phase of the decision variable to the most likely transmitted symbol.

If the value of m is too small making the delay too short then the effect will be that the points on the complex plane will be bunched. Alteratively if m is made too large causing the delay to be too long then the effect will be that the points on the complex plane will overlap.

Figure 4:
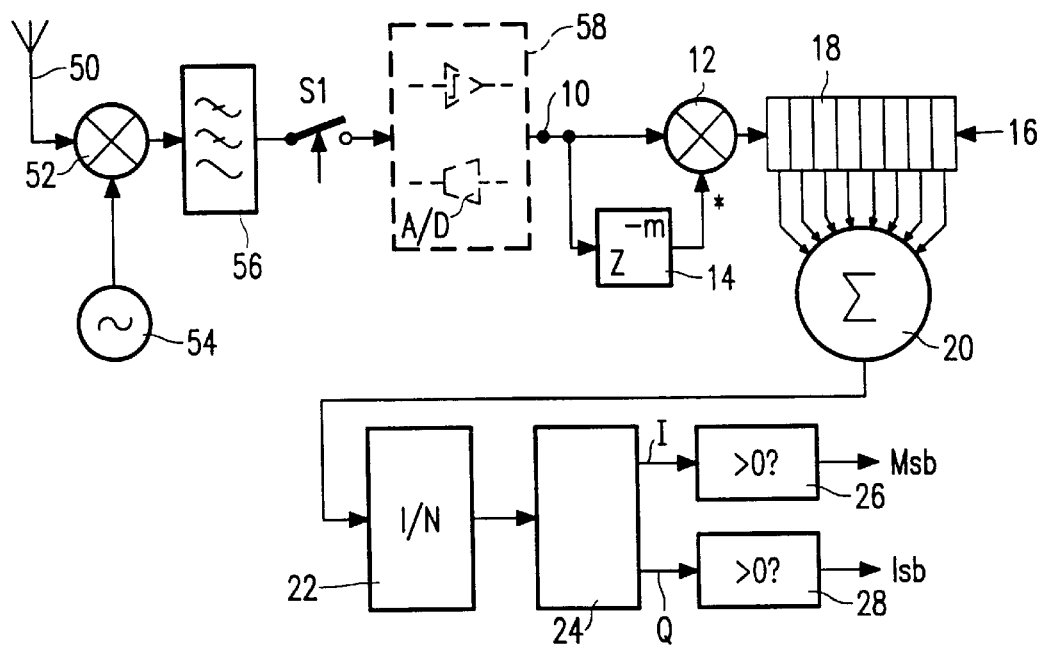
FIG. 4 is a block schematic diagram of an embodiment of a receiver made in accordance with the present invention.

Referring to FIG. 4, the receiver comprises a mixer 52 to one input of which an antenna 50 is connected and to a second input of which a local oscillator 54 is connected. The frequency of the local oscillator 54 is selected to frequency down convert the FSK signals received at the antenna 50 to zero IF signals. A low pass filter 56 selects the desired complex zero IF signals from the other products of mixing. Sampling means S1 are coupled to the output of the filter 56 and samples are supplied to an input 10 of a delay and multiply demodulator 12, 14 either directly or by way of an optional quantising means 58, such as a limiting amplifier or an analogue to digital converter, shown in broken lines.

The input 10 is coupled to one input of a complex multiplier 12, after being subject to a complex conjugate operation indicated by a * and to a delay stage 14, an output of which is coupled to a second input of the multiplier 12. The output of the multiplier 12 is coupled to a FIR filter 16 comprising a shift register 18 having N−m taps whose tap weights are set to unity. The taps are connected to an accumulator stage 20, an output of which is connected to a 1/N decimating stage 22 which produces an output at every N th sample. The decimating stage 22 has an output coupled to a complex to rectangular stage 24 which produces I and Q outputs which are coupled to respective decision stages 26, 28 which determine if the signals at their inputs are greater than zero. The outputs from the stages 26, 28 provide respectively the most significant bit (msb) and the least significant bit (lsb) of the di-bits, referred to in the phase map shown in FIG. 3.

In operation, decimation of the output of the FIR matched filter 16 should be performed at a timing phase determined by a suitable timing recovery means (for example square law symbol timing recovery).

In order to facilitate the understanding of the present invention consider the complex output of a baseband differential demodulator applied to π/4DQPSK. FIG. 4 illustrates how the differential encoding is removed by multiplying the complex signal by a delayed, complex conjugate version of itself, the conjugate being indicated by an *.

If the symbol spaced samples of $Z_{in}$ are denoted $Z_k$, and the noise samples by $N_k$. The random variable $N_k$ is assumed to be Gaussian distributed with zero mean and total variance $\sigma^2$. If the received amplitude is denoted by a, then $$Z_k = ae^{j(\Theta_k + \phi)} + N_k$$

where $\phi$ is an arbitrary phase due to the fading process and $\Theta_k$ is the phase information imposed at the transmitter for the current symbol. The other input to the complex multiplication is therefore $$Z_{k-m}^* = ae^{j(-\Theta_{k-m} - \phi)} + N_{k-m}^*$$

It is assumed that the fading is sufficiently slow for $\phi$ not to have changed during the symbol period. An expression for the samples of $Z_{OUT}$, given by $$Z_k Z_{k-m}^*$$

can now be written.

$$Z_k Z_{k-m}^* = a^2 e^{j(\Theta_k - \Theta_{k-m})} + a(e^{j(\Theta_k + \phi)} N_{k-m}^* + e^{j(-\Theta_{k-m} - \phi)} N_k) + N_k N_{k-m}^*$$ For simplicity the final term will be neglected both a and $\phi$ will be considered to be constant. It can then be seen that the real and imaginary parts of $$Z_k Z_{k-m}^*$$

are Gaussian distributed with variance $a^2 \sigma^2$. The mean is determined only by the first term and is conditional on the transmitted phase changes over m samples periods. If m is chosen such that the possible phase changes are $\Delta\phi \in \{\pm\pi/4, \pm 3\pi/4\}$, the mean of the real and imaginary parts of $$Z_k Z_{k-m}^*$$

will both have values of $$\pm a^2/\sqrt{2}$$

depending on the information bits transmitted. They are therefore treated as independant binary signals with additive Gaussian noise in the following analysis.

The p.d.f. of $x_i = \Re(Z_k Z_{k-m}^*)$ is approximately normal, the p.d.f. is given by $$f(x_i|b) = \frac{1}{a\sigma\sqrt{2\pi}} e^{-(x_i - a^2 b/\sqrt{2})^2 / 2a^2\sigma^2}$$

where b is either +1, or −1 depending on the transmitted l.s.b.

Similarly, the p.d.f. of $x_q = \Im(Z_k Z_{k-m}^*)$ is normal which is given by $$f(x_q|b) = \frac{1}{a\sigma\sqrt{2\pi}} e^{-(x_q - a^2 b/\sqrt{2})^2 / 2a^2\sigma^2}$$

where b is either +1 or −1 depending on the transmitted m.s.b. The likelihood ratio for $x_i$ is therefore (applying Bayes' theorem):

$$\Lambda_i = \frac{f(x_i|+1)}{f(x_i|-1)} = \frac{e^{-(x_i - a^2/\sqrt{2})^2 / 2a^2\sigma^2}}{e^{+(x_i + a^2/\sqrt{2})^2 / 2a^2\sigma^2}} = e^{a^2 x_i / 2a^2\sigma^2} = e^{\sqrt{2} \, x_i/\sigma^2}$$

And the log likelihood ratio is simply:

$$\ln(\Lambda_i) = \sqrt{2} \, x_i/\sigma^2$$

Similarly $$\ln(\Lambda_q) = \sqrt{2} \, x_q/\sigma^2$$

It follows from this that the quadrature outputs of a differential detector can be used directly as soft decision information under conditions of constant noise variance and reasonably high signal to noise ratios.

Figure 5:
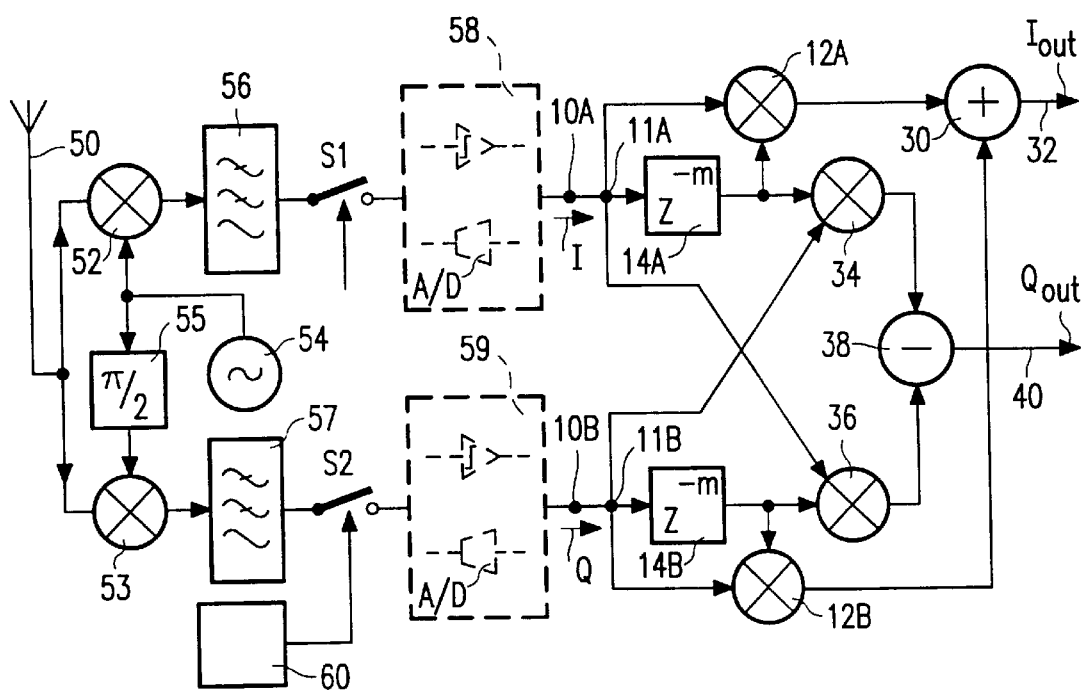
FIG. 5 is a block schematic diagram of another embodiment of a receiver made in accordance with the present invention.

FIG. 5 illustrates another embodiment of the invention in which the complex terms are expanded in terms of real arithmetic. Quadrature related signals I and Q are produced at respective inputs 10A, 10B of a demodulator by coupling the signals received at the antenna 50 to first inputs of mixers 52, 53. Quadrature related local oscillator signals are produced by a local oscillator 54 and a ninety degree phase shifter 55 and are supplied to second inputs of the mixers 52, 53. The local oscillator frequency is selected to mix the FSK signals down to a zero IF. The in-phase I and quadrature phase Q signals are selected from the products of mixing by respective low pass filters 56, 57. The I and Q signals are sampled using say switching devices S1 and S2 controlled by a controller 60. The samples are supplied to inputs 10A, 10B of a demodulator either directly or by way of quantising means 58, 59 each of which may comprise a limiting amplifier or an analogue to digital converter A/D. The inputs 10A, 10B are applied to respective junctions 11A, 11B at which the I and Q signals are applied to respective delay and multiply stages 12A, 14A and 12B, 14B. The outputs from the multipliers 12A, 12B are combined in a summation stage 30 and an output 32 provides an $I_{out}$ signal to a FIR filter, decimating stage and decision stage of the type shown in FIG. 4.

Signals at the output of the delay stage 14A and at the junction 11B are multiplied in a multiplier 34 and the product signal is applied to one input of a differencing stage 38. In a similar manner signals from the delay stage 14B and the junction 11A are multiplied in a multiplier 36 and the product is applied to a second input of the differencing stage 38. An output $Q_{out}$ from the stage 38 is applied to a terminal 40 to which is connected the combination of an FIR filter, decimating stage and decision stage (not shown).

It should be noted that the outputs of the respective decimating stages can be used directly as soft decisions for further forward error correction (FEC) processing.

The inner part of the structure shown in FIG. 5 can be recognised as being very similar to the part of the differentiate and multiply architecture. The outer part is used to calculate the real part of the full delay and multiply construct, which is normally not required in the FM discriminator.

Rather than try to minimise the non-linear characteristic of FM discriminator, it is recognised that $Q_{out}=\sin \Delta\phi$ and $I_{out}=\cos \Delta\phi$, where $\Delta\phi$ is the phase change per over m samples delay. Thus the received frequency shifts are mapped on to distinct points on the complex plane. For example, the physical realisation could be either in terms of analogue electronics or a discrete time digital system. The use of Z notation to express delay implies a discrete time implementation, but this is not meant to exclude the possibility of an analogue alternative.

Figure 6:
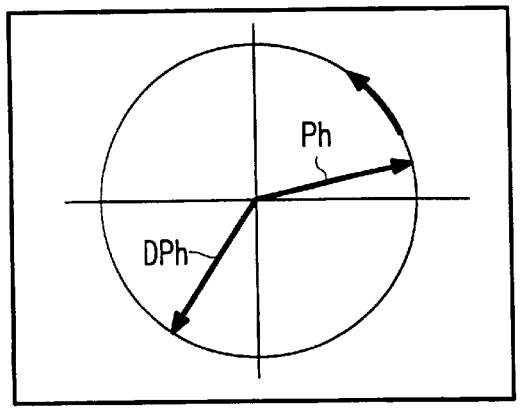
FIG. 6 illustrates the phasers at an input to a complex multiply/conjugate stage (4.8 kHz deviation, linear version).

For the sake of completeness a limiting version of the delay and multiply demodulator will be described, in this version the I and Q inputs to the demodulator are individually limited (quantized to one bit) on the way into the delay and multiply demodulator. The operation of the limited input version will now be explained taking the case of 4-FSK with deviations of ±4.8 kHz and ±1.6 kHz at 3200 Baud and 72 samples per symbol. Consider an input deviation of 4.8 kHz, and a delay chosen as m=18 samples. Referring to FIG. 6 this input signal can be viewed as a phasor Ph rotating 1.5 times round the unit circle, while the delayed version DPh lags $3\pi/4$ radians behind.

In the linear case, the decision variable is formed by taking the complex product (with conjugate of one input) of these two rotating vectors, which results in a constant vector of $e^{j3\pi/4}$ for the interval over which both phasors are rotating at the same rate (N−m samples). These output vectors are summed in the FIR filter to produce one large vector (N−m) $e^{j3\pi/4}$ which will be used to make the symbol decision.

In the case of single-bit I and Q inputs, the phasors must have an argument which is one of $\pi(n+\frac{1}{2})/2, n=0, 1 \ldots 3$ and so the difference of two arguments (as formed by the complex multiply with conjugate operation) must be a multiple of $\pi/2$. This seems inconvenient as the difference of the two arguments to be $\pm 3\pi/4$ or $\pm\pi/4$ is required. However, the vector addition of the partial results gives an approximation to the desired decision variable. For example, a 4.8 kHz deviation symbol may cause the following samples to be integrated in the 54-tap (N−m=72−18=54) FIR filter: 6×−1, 6×j, 6×−1, 6×j, 6×−1, 6×j, 6×−1, 6×j, 6×−1 (where x represents repetition). This decision variable has approximately the desired phase, since a resultant vector with same absolute values for the real and imaginary parts e.g., 54 (−1+j) would be expected.

For the lower deviations of ±1.6 kHz, the two phasors are nominally ±π/4 radians apart but due to the quantisation of I and Q components this is forced to be either 0 or ±π/2 radians. The typical run length for each possible decision vector is 18 samples, so the 54-tap FIR filter may contain a sequence such as 18×1, 18×j, 18×1, which again is an approximation to the expected linear case result of 54 (1+j).

The single-bit nature of the input signals would allow a relatively simple digital circuit to be used to implement the scheme shown in FIG. 5. For example the multipliers 12A, 12B, 34, 36, could be replaced by exclusive NOR gates and the adder and subtractor blocks 30, 38 could be half adders.

From reading the present disclosure, other modifications will be apparent to persons skilled in the art. Such modifications may involve other features which are already known in the design, manufacture and use of FSK demodulators and receivers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method of receiving and demodulating M-ary FSK (Frequency Shift Keyed) symbols, where M equals 2 or 4, comprising providing quadrature related, frequency down-converted signals at substantially zero intermediate frequency, over-sampling the signals, multiplying each sample by a time delayed sample, the amount of time delay being such that the products of multiplication comprise log likelihood ratios for the bits which compose the M-ary FSK symbols, and combining a plurality of said log likelihood ratios in an integrating filter to obtain a maximum likelihood estimate of the bits comprising the symbols as transmitted.

2. A method as claimed in claim 1, wherein the choice of delay, m, is determined in accordance with the following equation $$\hat{\omega}T_s m = \frac{\pi(M-1)}{M}$$

where $T_s$ is the sampling interval, and $\hat{\omega}$ is the maximum angular deviation in radians per second.

3. A receiver for M-ary FSK (Frequency Shift Keyed) symbols, where M equals 2 or 4, comprising means for producing quadrature related signals at substantially zero intermediate frequency, means for over-sampling the quadrature related signals to produce samples, a delay and multiply demodulator having an input for said samples, a time delay m of the delay and multiply demodulator being selected such that quadrature related outputs of the demodulator are log likelihood ratios for bits which compose the M-ary symbols, and an integrating filter for combining a plurality of said log likelihood ratios to obtain a maximum likelihood estimate of the bits comprising the symbols.

4. A receiver as claimed in claim 3, wherein the time delay m is selected in accordance with the equation $$\hat{\omega}T_s m = \frac{\pi(M-1)}{M}$$

where $T_s$ is the sampling interval and $\hat{\omega}$ is the maximum deviation in rations per second.

5. A receiver as claimed in claim 3, characterised in that the integrating filter comprises FIR filter whose tap weights are set to unity.

6. A receiver as claimed in claims 3, characterised in that the demodulator further comprises decimating means coupled to an output of the integrating filter, means coupled to the decimating means for producing quadrature related outputs and means for making a decision on the basis of each of the quadrature related outputs being greater than or less than zero.

7. A receiver as claimed in claim 3, characterised in that said means for producing quadrature related output signals has first and second outputs for the in-phase and quadrature-phase signals respectively, in that first and second delay and multiply demodulators are coupled to the first and second signal outputs respectively, in that each of the first and second delay and multiply demodulators comprises first and second delay means coupled to the first and second signal outputs, respectively, and having respective first and second delayed outputs, first multiplying means having a first input coupled to the first signal output of said means for producing quadrature related signals and a second input coupled to the first delayed output, second multiplying means having a first input coupled to the second signal output of said means for producing quadrature related signals and a second input coupled to the second delayed output, third multiplying means having a first input coupled to the first delayed output and a second input coupled to the second signal output of said means for producing quadrature related signals, fourth multiplying means having a first input coupled to the second delayed output and a second input coupled to the first signal output of said means for producing quadrature related signals, summing means coupled to the outputs of the first and second multiplying means for providing in-phase log likelihood ratios, and differencing means coupled to the outputs of the third and fourth multiplying means for providing quadrature log likelihood ratios.

8. A receiver as claimed in claim 7, characterized in that the first, second, third and fourth multiplying means comprise NOR gates.

9. A method of demodulating a M-ary FSK (Frequency Shift Keyed) signal, where M equals 2 or 4, comprising over-sampling each symbol interval of the FSK signal to produce a plurality of sub-samples, deriving log likelihood ratios from the sub-samples associated with each said symbol interval, and integrating the log likelihood ratios to obtain a maximum likelihood estimate of a symbol in the FSK signal.

10. A method as claimed in claim 9, wherein the step of deriving log likelihood ratios is implemented by multiplying each sub-sample by a time delayed sub-sample, the amount of the time delay being such that products of said multiplying step comprise log likelihood ratios for the sub-samples which compose the symbol interval.

11. A demodulator for a M-ary FSK (Frequency Shift Keyed) signal, where M equals 2 or 4, comprising means for over-sampling each symbol interval of the FSK signal to produce a plurality of sub-samples, means for deriving log likelihood ratios from the sub-samples associated with each said symbol interval and means for integrating the log likelihood ratios to produce a maximum likelihood estimate of a symbol in the FSK signal.

12. A demodulator as claimed in claim 11, wherein the means for deriving log likelihood ratios comprises a delay and multiply demodulator having an input for said sub-samples, a time delay of the delay and multiply demodulator being selected such that products of said delay and multiply demodulator are log likelihood ratios for the sub-samples which compose the symbol period.

* * * * *